United States Patent [19]
McManus

[11] Patent Number: 5,138,790
[45] Date of Patent: Aug. 18, 1992

[54] EASY RELEASE-DETACHABLE FISHHOOK

[76] Inventor: Phillip W. McManus, 1701 Hardy Rd., Grand Prairie, Tex. 75051

[21] Appl. No.: 760,581

[22] Filed: Sep. 16, 1991

[51] Int. Cl.$^5$ .............................................. A01K 91/04
[52] U.S. Cl. .................................. 43/44.83; 43/43.16; 43/44.86
[58] Field of Search .................. 43/43.16, 44.86, 44.83

[56] References Cited

U.S. PATENT DOCUMENTS

| | | | |
|---|---|---|---|
| 1,307,411 | 6/1919 | Moore | 43/44.83 |
| 1,522,451 | 1/1925 | Hayes | 43/42.08 |
| 2,992,507 | 7/1961 | Gray | 43/44.83 X |
| 4,535,562 | 7/1985 | Fry | 43/44.95 |
| 4,667,435 | 5/1987 | Fujimoto | 43/44.83 X |
| 4,807,387 | 2/1989 | Dougherty et al. | 43/42.09 |
| 4,987,697 | 1/1991 | Klein | 43/44.83 |

Primary Examiner—Richard K. Seidel
Assistant Examiner—Patty E. Hong
Attorney, Agent, or Firm—Warren H. Kintzinger

[57] ABSTRACT

A three piece easy release detachable fishhook is provided having a hook member with an angle formed portion terminating with an upward extended shank end, an upper hook connection member having a top end fish line tie on opening, an upper round shank portion extending from the top end opening a specific length exceeding the length of a slide down hook retaining cylindrical sleeve and a portion extending downwardly from the bottom shoulder of the upper round shank portion in a section that is channel shaped throughout its length and formed to the contour of the angle formed portion of said hook member. The slide down hook cylindrical sleeve in the slide down state locks the hook member angle formed portion seated in the channel shaped section of the upper hook connection member maintaining the easy release detachable fishhook in the assembled state. When the slide down hook cylindrical sleeve is raised to an upper position the hook member is free to fall away from the upper hook connection.

9 Claims, 3 Drawing Sheets

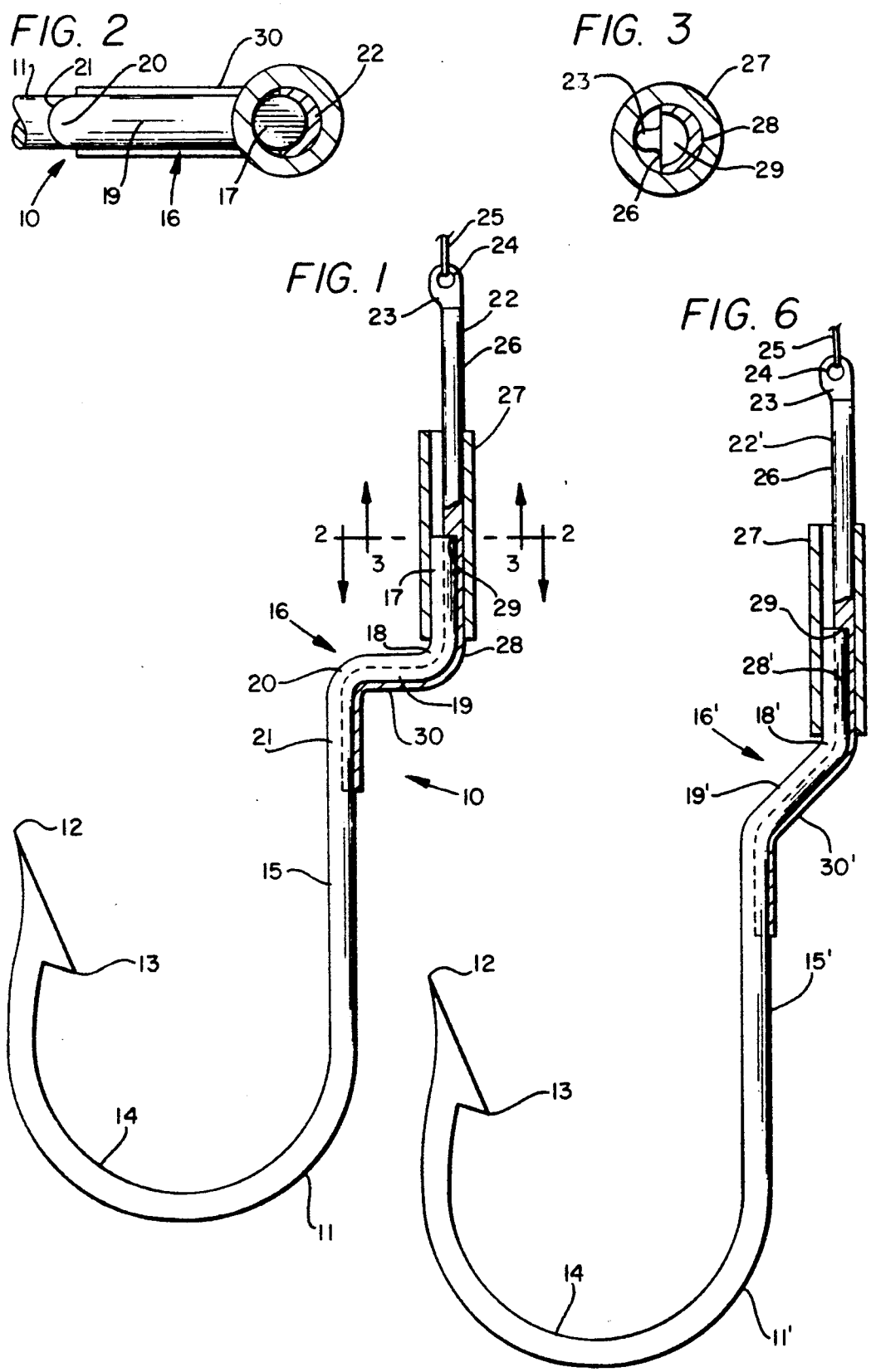

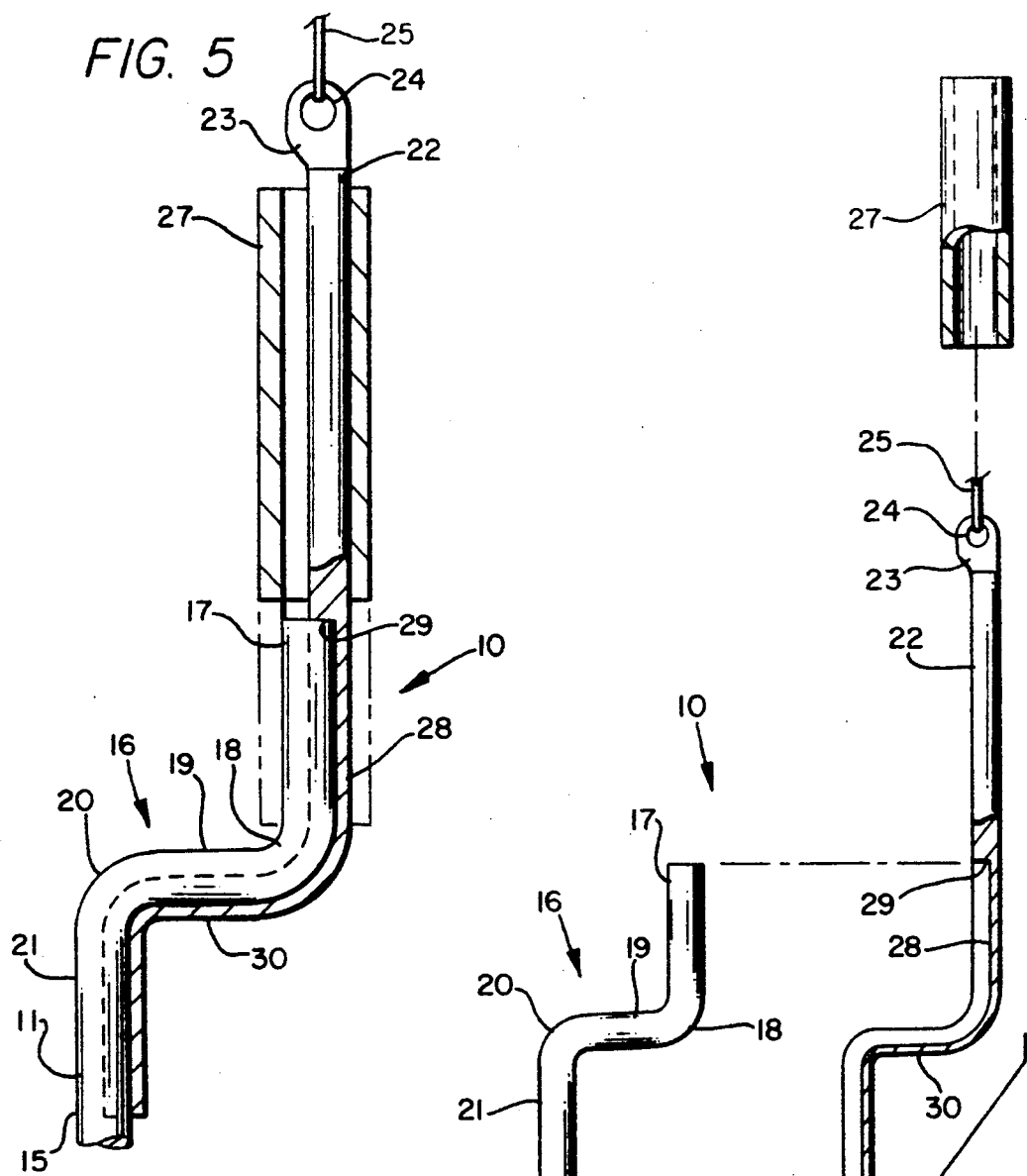

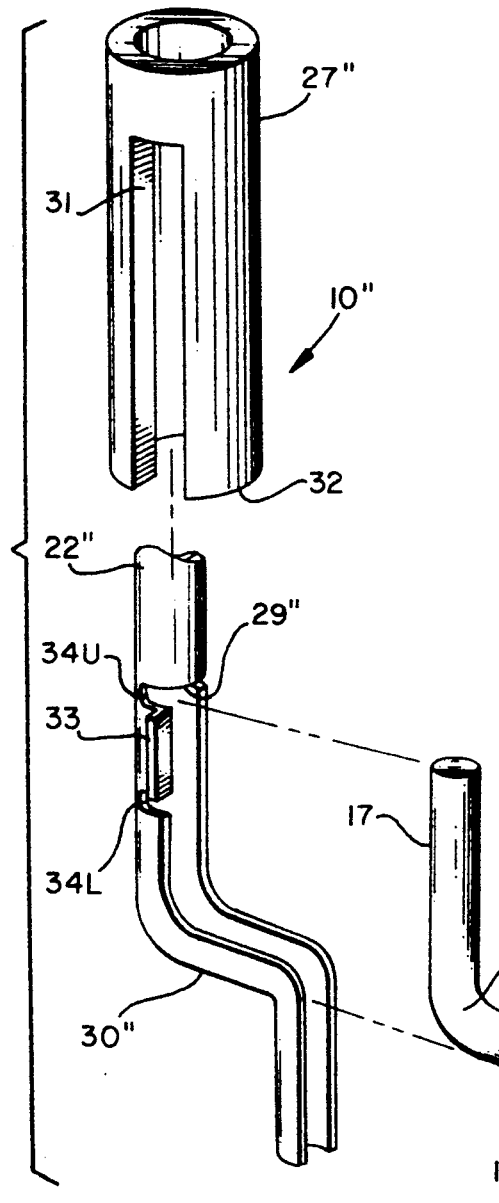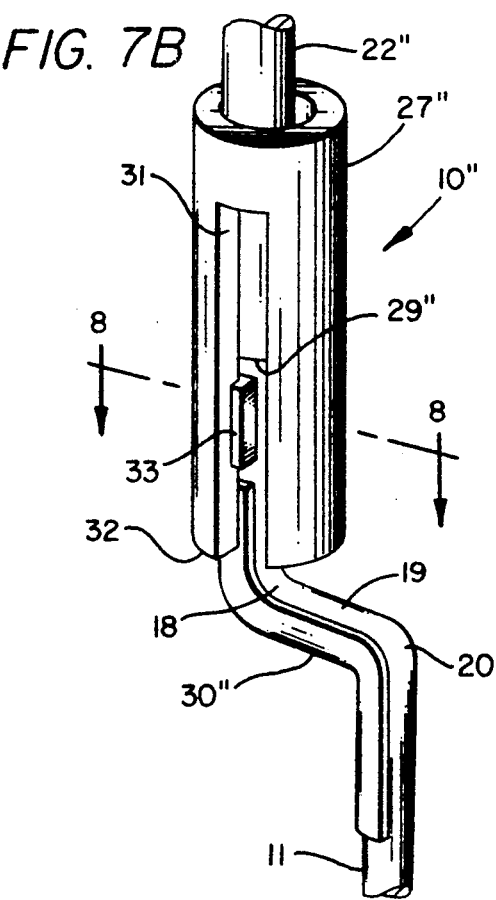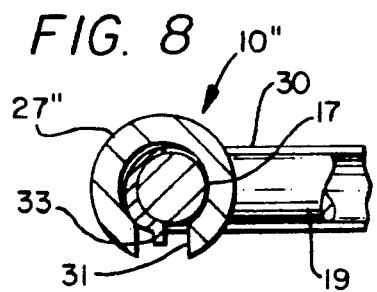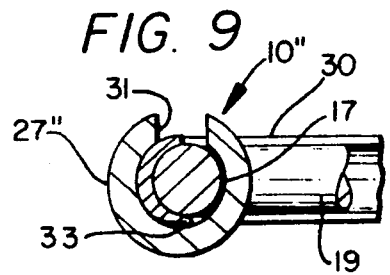

EASY RELEASE-DETACHABLE FISHHOOK

This invention relates in general to fishhooks, and more particularly, to an easy release detachable three piece fishhook.

Many fish when landed by a fisherman using fishing gear with a line and hook are quite active flipping and flopping around making it quite difficult to remove the barbed fishhook from the mouth of the fish at that time. The fisherman is subject to being bitten by some fish and/or sometimes getting hurt by the barbed hook with the difficulties encountered in removing the hook from the fish's mouth. If the fisherman has to wait until the fish has stopped moving to remove the fishhook he may have to wait an undesired length of time or cut the line to fasten it to another hook. In this situation most fishermen do not like cutting the line but the more time he can have a baited hook in the water the more fish he is likely to catch. Another problem is that if a fishhook is not securely set in the fish's mouth with the various movements of the fish and reaction forces imposed on the hook it may break loose and the fish become lost.

It is therefore a principal object of this invention to provide an easy release detachable fishhook that makes release of the connector and fish line from the hook easier, quicker and much safer than extracting a fishhook from the mouth of a still active fish.

Another object is to eliminate having to cut a fish line to free the fishing equipment from direct connection to a newly landed fish.

A further object is to provide a fishing hook system where extra hook sections can be pre-baited for hook shank connection to a fish line hook connector.

Still another object with such a fishhook structure is to increase the time a fisherman is able to have baited hook and line in the water.

Features of the invention useful in accomplishing the above objects include, in a three piece easy release detachable fishhook having a hook member with an angle formed portion terminating with an upward extended shank end, an upper hook connection member having a top end fish line tie on opening, an upper round shank portion extending from the top end opening a specific length exceeding the length of a slide down hook retaining cylindrical sleeve and a portion extending downwardly from the bottom shoulder of the upper round shank portion in a section that is channel shaped throughout its length and formed to the contour of the angle formed portion of said hook member. The slide down hook cylindrical sleeve in the slide down state locks the hook member angle formed portion seated in the channel shaped section of the upper hook connection member maintaining the easy release detachable fishhook in the assembled state. When the slide down hook cylindrical sleeve is raised to an upper position the hook member is free to fall away from the upper hook connection.

Specific embodiments representing what are presently regarded as the best modes of carrying out the invention are illustrated in the accompanying drawings.

In the drawings:

FIG. 1 represents a side elevation view partially broken away and sectioned view showing detail of a three piece assembled and lock interconnected easy release detachable fishhook;

FIG. 2, a partial cut away along line 2—2 of FIG. 1 top view showing interconnect detail;

FIG. 3, a partial cut away along line 3—3 of FIG. 1 view looking upward showing additional detail;

FIG. 4, an exploded side elevation view with portions broken away and sectioned of the three piece easy release detachable fishhook of FIGS. 1-3;

FIG. 5, a partial cut away and sectioned view of the three piece easy release detachable fishhook of FIGS. 1-4 with the cylindrical hook release member in the raised hook release position;

FIG. 6, a partially broken away and sectioned side elevation view of another embodiment of a three piece easy release detachable fishhook with an interim angled section in place of the right angled leg hip to knee section of the FIGS. 1-5 embodiment;

FIG. 7A, a perspective exploded view of yet another three piece easy release detachable fishhook embodiment with cylinder slot deflectable tab release structure;

FIG. 7B, a partial side elevation view of the assembled three piece easy release detachable fishhook of FIG. 7A;

FIG. 8, a partial cut away and sectioned view taken from line 8—8 of FIG. 7B of the assembled three piece fishhook of FIG. 7B with the tab and release sleeve slot in easy release alignment; and, FIG. 9, a partial cut away and sectioned view like FIG. 8 with the tab and release sleeve rotated to a tab deflected and assembled locked state.

Referring to the drawings:

The easy release detachable three piece fishhook 10 of FIGS. 1-5 has a lower hook member 11 with a pointed end 12 with a barb 13 out of an intermediate portion 14 from an upwardly extended shank portion 15 that includes an angle formed section 16 from an upper body end 17 a right angle hip bend 18 to an upper leg extension 19 to and through a right angle knee bend 20 to a depending lower leg extension 21 in the shank portion 15. An upper hook connection member 22 is included having a top flattened end 23 with opening 24 for being tied to fish line 25, an upper semi round shank 26 extending from the top flattened end 23 a length exceeding the length of a hook 11 retaining cylindrical sleeve 27. The upper hook connection member 22 has a lower portion 28, extending downwardly from the bottom shoulder 29 of upper round shank 26, that is channel shaped throughout its length and formed to the contour of the angle formed section 16 of the lower hook member 11. The hook retaining cylindrical sleeve 27 is slidable up from the three piece fishhook 10 assembled locked state of FIG. 1 to the raised hook member 11 release position of FIG. 5 for easy release of the hook member 11 such as the fall apart stage of FIG. 4. With cylindrical sleeve 27 in the lowered state it holds the hook member 11 seated in the like contoured channel shaped lower portion 28 of upper hook connection member 29 with the right angled upper leg portion 30 thereof also restraining hook member 11 in the three piece fish hook 10 assembly.

With the embodiment of FIG. 6 much of the three piece hook 10' is the same as with the embodiment of FIGS. 1-5 and are numbered the same and those that differ yet much the same are given primed numbers without explanation being repeated again as a matter of convenience. The angled section of this embodiment is not a right angled upper leg section 16' with less than ninety degree bends but the basic overall function is substantially the same.

Referring now to the three piece easy release detachable fishhook 10" embodiment of FIGS. 7A, 7B, 8 and 9 a hook is shown that has many features in common with the embodiment of FIGS. 1-5. The lower hook member 11 is the same but the cylinder 27" has a longitudinal slot 31 extended from the bottom 32 thereof upwardly through most of the cylinder length. Upper hook connection 22", while much the same as its counterpart of the FIGS. 1-5 embodiment, has an outwardly sidewise extended deflectable tab 33 with opposite end slots 34U and 34L for enhanced resilient deflection thereof when the cylinder 27" is rotated from a cylinder 27" free to move state of FIGS. 7B and 8 to the tab 33 deflected and assembled locked state of FIG. 9. Since operational function of the balance of this embodiment is substantially the same as with the embodiments of FIGS. 1-5 it is not repeated again as a matter of convenience.

Whereas this invention has been described with respect to three embodiments thereof, it should be realized that various changes may be made without departure from the essential contributions to the art made by the teachings hereof.

I claim:

1. An easy release multi piece detachable fishhook comprising: a hook member with an interim angle formed portion terminating with an upward extended shank end; an upper hook connection member having a top end fish line tie on opening, an upper shank portion extending from the top end opening to a shoulder at the bottom of the upper shank portion, and a bottom section channel shaped throughout its length and formed to the contour of the angle formed portion of said hook member; and an upward and downward slidable cylindrical sleeve shorter than the length of said upper shank portion of said upper hook connection member slidable upward from a slidable down state position locking the hook member angle formed portion seated in the channel shaped section of the upper hook connection member and maintaining the easy release detachable fishhook in the assembled state; said slidable cylindrical sleeve raiseable to an upper release position with said hook member free to fall away from said upper hook connection; and wherein said upward and downward slidable cylindrical sleeve has a longitudinal slot extended from the bottom thereof upward through most of the length thereof.

2. The easy release multi piece detachable fishhook of claim 1, wherein said upper hook connection member has an outwardly sidewise extended resiliently deflectable tab extendable into said longitudinal slot in a cylinder free to move state; and with rotation of said cylinder resilient deflection of said tab to a deflected and assembled locked state.

3. The easy release multi piece detachable fishhook of claim 2, wherein pieces of said multi piece fishhook are shaped of metal.

4. The easy release multi piece detachable fishhook of claim 3, wherein said upper hook connection member is made of a resiliently deflectable metal different from the metal of said cylinder and of said hook member.

5. The easy release multi piece detachable fishhook of claim 2, wherein said interim angle formed portion of said hook member extends laterally from the axis of said upward extended shank end.

6. The easy release multi piece detachable fishhook of claim 5, wherein said interim angle formed portion of said hook member is at right angles to the axis of said upward extended shank end.

7. The easy release multi piece detachable fishhook of claim 5, wherein said interim angle formed portion of said hook member extends laterally at an obtuse angle to the axis of said upward extended shank end.

8. The easy release multi piece detachable fishhook of claim 5, wherein said hook member has a downwardly extended bottom shank portion generally parallel to the axis of said upwardly extended shank end; and said downwardly extended bottom shank portion terminating in curvature transistion of the hook end of said hook member.

9. The easy release multi piece detachable fishhook of claim 8, wherein the bottom channel shaped section of said upper hook connection member extends downwardly from said interim angle formed portion of said hook member coextensive with a top end section of said downwardly extended bottom shank portion when in the assembled state.

* * * * *